May 2, 1933.  R. T. BOWLING  1,906,245
BRIQUETTING MACHINE
Filed Aug. 3, 1931  2 Sheets-Sheet 1
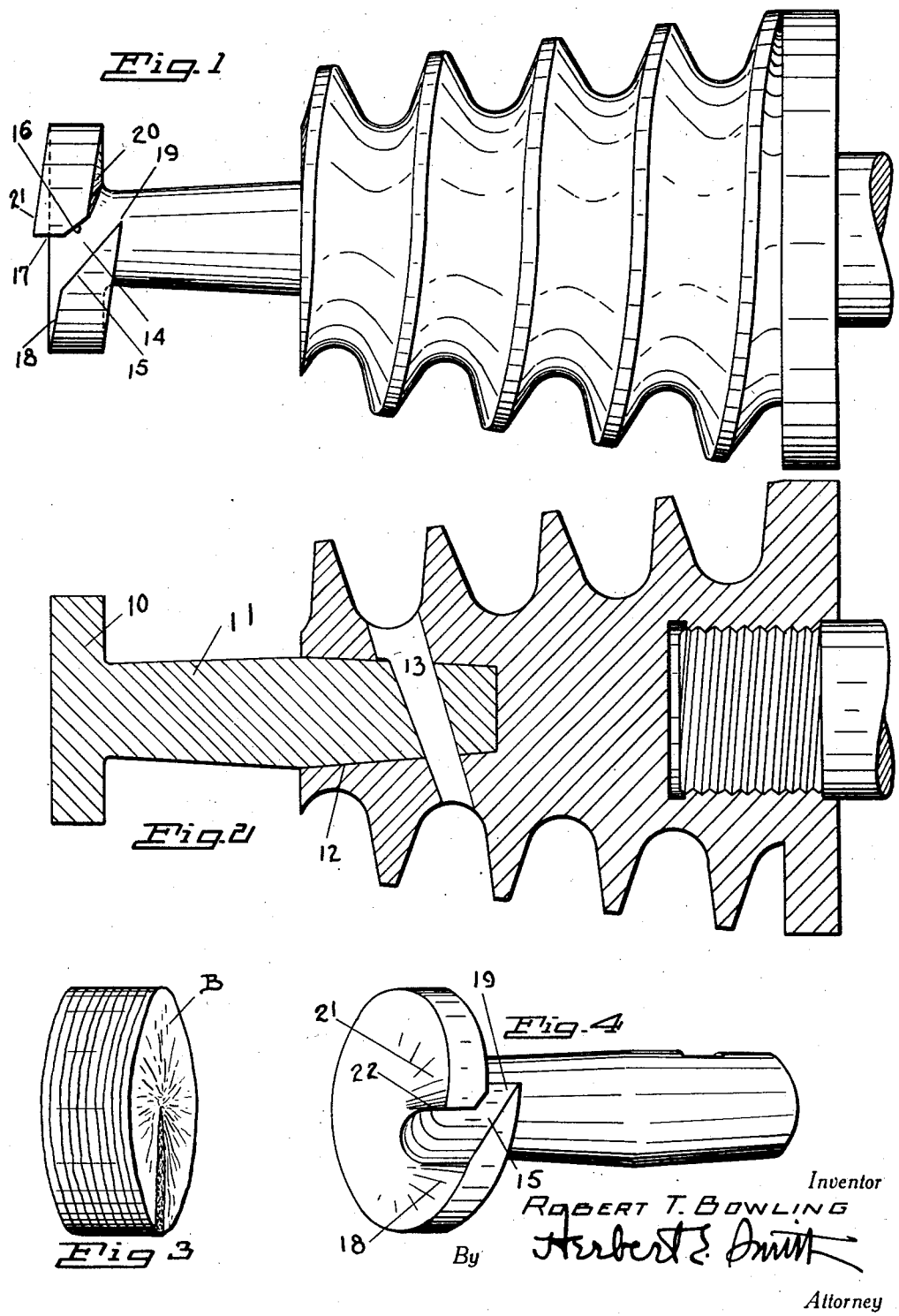
Inventor
ROBERT T. BOWLING
By Herbert E. Smith
Attorney

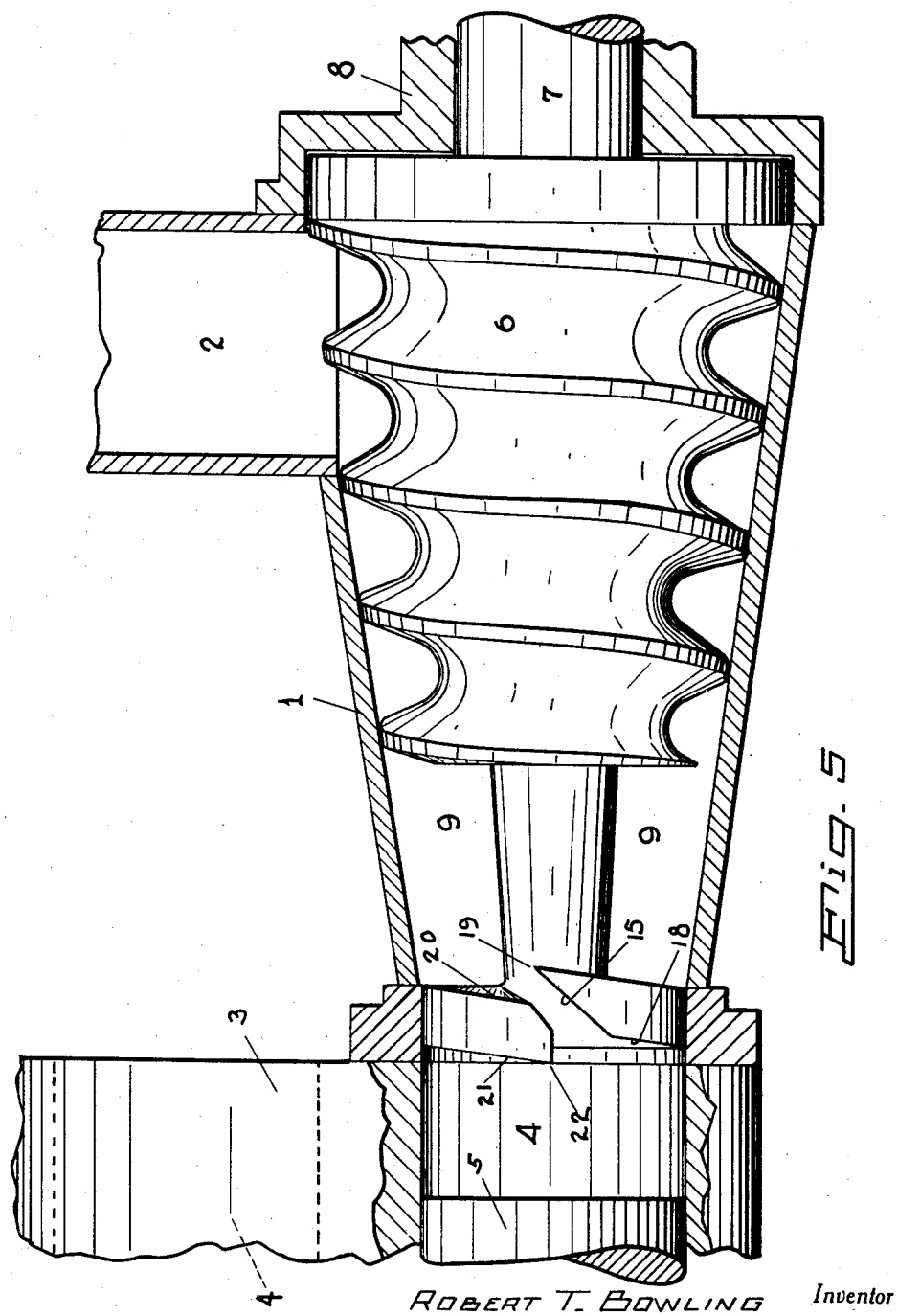

Patented May 2, 1933

1,906,245

UNITED STATES PATENT OFFICE

ROBERT T. BOWLING, OF LEWISTON, IDAHO, ASSIGNOR, BY MESNE ASSIGNMENTS, TO POTLATCH FORESTS, INC., OF LEWISTON, IDAHO

BRIQUETTING MACHINE

Application filed August 3, 1931. Serial No. 554,669.

My present invention relates to improvements in briquetting machines or presses for molding solid cylindrical briquettes from saw dust, wood shavings, vegetable fibers, etc., and of the type disclosed in my pending application for patent, Ser. No. 458,580, filed May 31, 1930.

In carrying out my invention a tapered feed screw forces the material through a compression chamber, and a specially formed head on the screw presses the material into a second compression chamber against the resistance of a movable or yieldable die or abutment, and in the above entitled application means are provided for varying the resistance of the yieldable die in order to modify the density of the solid cylindrical briquette.

The second compression chamber is formed in a revolvable mold-wheel having cylindrical compression chambers at its outer periphery adapted successively to register or aline with the specially formed, rotary press-head. This revolvable mold-wheel or mold carrier is intermittently operated to remove a pressed briquette and to move an empty mold to position for use between the rotary press-head or die-head and the yieldable die.

The pressed material is laid in the hollow cylindrical mold or second compression chamber in a continuous spiral layer having a width equal to the radius, or one-half the diameter of the rotary die-head and the cylindrical mold, and the finished, solid briquette is thus formed by spiral laminations which strengthen and reinforce the body structure of the briquette.

The sap, resin, pitch, and other moisture present in the wood shavings, dust, or fibers, is expressed therefrom during two states of compression of the material, by the use of a tapered feed screw, and a die-head spaced in advance of the screw and revolving therewith, and this moisture is used as a binder for cementing together not only the particles of the material, but also the continuous ribbon or layer formed by the die-head and fashioned into the solid cylindrical briquette.

In the formation of the briquette the material is necessarily subjected to a high compression, with consequent wear on the operating parts and a high degree of temperature, due to the friction between the material and the operating parts. Under these conditions, a high grade or quality of metal is required in the operating parts of the machine, which requirement, of course, adds to the cost of manufacture and to the cost of maintenance. By employing two stages of compression for the material, I am enabled to manufacture the feed screw at comparatively low cost and operate it with less wear than is caused in a single-stage compression by the feed screw. The die-head which subjects the material to the second stage of compression is manufactured from a higher grade of metal to withstand the greater degree of compression and heat, and to prolong its durability. In this manner the cost of production of the briquettes is reduced, while the efficiency in operation of the machine is increased, over the cost and efficiency of prior machines for this purpose.

My invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention, but it will be understood that various changes and alterations may be made in the exemplified structure within the scope of my claims without departing from the principles of the invention.

Figure 1 is a side view of the combined feed screw and die-head of my invention.

Figure 2 is a longitudinal, central, sectional view of the device of Figure 1.

Figure 3 is a perspective view of a briquette as manufactured in the machine.

Figure 4 is a perspective view of the detachable die-head.

Figure 5 is a broken sectional view of so much of the machine as is necessary to illustrate the relation of parts, showing the feed screw and die-head in side elevation.

In carrying out my invention I employ a tapered or conical drum 1, disposed horizontally, and provided at its larger end with a gravity-feed hopper 2 through which the material is fed to the drum.

At the forward end of the drum is located a rotary mold-wheel or mold-carrier 3, having at its periphery an annular series of molds or cylindrical compression chambers 4. The mold carrier is intermittently revolved on its axis parallel with the longitudinal axis of the drum, and the molds 4 pass transversely across the front of the drum. The briquette B (Figure 3) is fashioned in this mold or compression chamber 4, and the material of which the briquette is fashioned is pressed against a solid cylindrical yieldable die or abutment 5 that reciprocates in the mold. For the initial stage in the formation of the briquette this die is moved to the right in Figure 5 in the compression chamber 4. Means are provided at the left end of the longitudinally movable die 5 to offer a yielding resistance to the movement of the die and the latter is moved to the left and backed out of the mold or compression chamber by the formation of the briquette. Means may be provided for varying this yielding resistance to modify the density with which the briquette is compressed.

After the briquette has been formed, the mold wheel is turned one step to remove the loaded mold from alinement with the drum and to bring an empty mold into alinement with the drum for the formation of another briquette.

Within the drum 1 I employ a tapered feed screw 6 having a shaft 7 that is journaled in suitable bearings as 8 and revolved through suitable gearing and power mechanism, not shown.

The feed screw, it will be noted, is of less length than the drum, and the unoccupied space 9 in the forward part of the drum forms a first-compression chamber, in which the material is compressed as it is fed thereto along the threads of the feed screw from the hopper 2.

At the forward or front end of the feed screw is mounted a circular disk 10 forming the die-head, which disk is fashioned with a spindle 11 that is seated in a socket 12 in the front end of the feed screw, and a diagonally extending key 13 passing through alined key-ways or slots in the screw and spindle locks the head through its spindle securely and rigidly to the feed screw.

As indicated in Figure 5 the die-head is located at the front end of the first compression chamber 9, and it forms the wall or abutment against which the material is pressed by the feed of the tapered screw 6. As the material is conveyed toward the first compression chamber 9 by the threads of the screw 6 the material partakes of the revolving motion of the screw, but when the chamber 9 is filled with the material in a dense mass, the pressure and consequent friction in the mass against the die-head, holds the mass stationary, while the screw and the die-head, of course, revolve.

The screw and the die-head revolve clockwise, and the die-head performs the dual function of cutting or slicing a continuous ribbon or layer from the material in chamber 9 at the right side of the head while at the same time compressing the layer or ribbon into a solid cylinder in the mold 4 at the left or front face of the head.

For slicing or cutting the layer or ribbon from the mass in chamber 9 the die-head is fashioned and operates similar to a screw thread, and the ribbon or layer is conveyed through the die-head from right to left in Figure 5, that is, from the first compression chamber 9 into the second compression chamber or mold 4. For this purpose the head is fashioned with a slot 14 that extends inwardly from the periphery of the circular head to the periphery of the spindle 11 at the back of the head, while at the front face of the head the slot is of greater depth, that is, it extends nearer to the center of the disk than at the rear or back face. As best seen in Figures 1 and 4, the slot, although passing transversely through the head, is arranged diagonally thereof, and its opposed walls are not parallel. Thus the inclined wall 15 and its opposed wall 16 diverge from the back face toward the front face of the head to form the opening or slot 14, and the wall 17 with which the wall 16 merges toward the front of the face of the head bounds one side of the slot. The wall 15 also merges with an inclined depression 18 of arcuate shape in the front face of the head, and thus it will be apparent that the opening of the slot not only flares outwardly in depth, but also flares outwardly in width from the back face to the front face of the head.

At the back face of the head the slot wall 15 terminates in an inset cutting edge 19 which extends in radial direction from the periphery of the head to the periphery of the spindle, and behind this cutting edge the back face of the head declines until it reaches the depression 20 at the opposite side of the mouth or entrance of the slot. This declination in the face of the head guides the material to the mouth of the revolving head, and the cutting edge 19 severs the ribbon or layer from the mass of material.

The constantly revolving head passes or conveys the sliced layer or ribbon through the slot, and the layer is continuously "laid" in the second compression chamber or mold 4.

In the mold the material is compressed to a greater density than in the first compression chamber 9, and this density may be varied by modifying the yielding resistance offered by the longitudinally movable die 5.

The depression 18 on the front face of the head rises to a cam face 21 which terminates in the radial edge 22 of the slot and it will be apparent that the back and front faces of the head from the latter into a single screw-thread, with a slot therethrough, by means of which the spiral back face feeds the material to the cutting edge 19, the slot passes the ribbon through the head to its front face, and the spiral front face compresses the spiral ribbon against the die 5 to form the briquette.

The pitch of the two spiral faces of the die-head has been determined by trial, tests and experiment, and is substantially as indicated in the drawings, and the relative position of the slot has also been determined after considerable tests were made in the actual operation of the machine. The necessary strength for withstanding pressure and wear has been secured in the tapered feed screw which as shown is comparatively short, but is not subjected to such a great degree of wear and pressure as is the single-thread die-head.

The removable and replaceable die-head is preferably constructed of high grade steel, as chrome-nickel, with a high carbon content, and a coating of hard material, as stellite, is applied to the head with an acetylene torch, after which the surface of the head is ground to proper dimensions and polished. Should the die-head become useless from wear, it may readily be removed from the feed screw and replaced with facility by a new head, at comparatively slight cost.

Having thus fully described my invention, what I claim as new and desire to secure by Letters Patent is:—

1. In a briquette machine the combination with a mold and a die and a feed drum communicating with the mold, of a feed screw in the drum and a compression chamber between the end of said screw and the mold, a spaced head on the screw having an opening affording communication between said compression chamber and mold, and means on the head for compressing material in said mold.

2. In a briquette machine the combination with a feed drum, a mold communicating therewith and a die for said mold, of a conveyer in the drum, a die-head in the drum adjacent the mold and forming a compression chamber in front of the conveyer, means for operating the conveyer to compress material against the die-head, said die-head having an opening therethrough between the compression chamber and the mold, and means for operating the die-head to pass material from the compression chamber and compress said material in the mold.

3. In a briquette machine, the combination with means for compressing material into a compact mass, means for cutting the mass into a spiral layer, and means for compressing the spiral layer into a solid cylindrical briquette.

4. In a briquette machine the combination with a feed screw for compacting a mass, of a rotary die-head having means for cutting a spiral layer from said mass, and said die-head having means for compressing the spiral layer into a solid cylindrical briquette.

5. In a briquette machine having a compression chamber and a mold and a movable die for said mold, the combination with a tapered feed screw, of a spaced die-head having a spindle rigid with the feed screw, said die-head having front and back spiral faces and a transverse groove, and means for revolving the feed screw and die-head.

6. In a briquette machine having a compression chamber, a mold and a die for the mold, the combination with a tapered drum, of a tapered feed screw in the drum and forming a compression chamber therein, of a die-head having a spindle rigid with said feed screw, said die-head having a cutting edge in the compression chamber and a transverse groove related to said cutting edge, and said die-head having oppositely arranged spiral faces.

In testimony whereof I affix my signature.

ROBERT T. BOWLING.